United States Patent [19]
Co

[11] Patent Number: 5,436,934
[45] Date of Patent: Jul. 25, 1995

[54] DIFFERENTIAL HIGH FREQUENCY LEVEL DETECTOR AND DATA RESTORATION CIRCUIT INCLUDING SQUELCH OFFSET AND SLICING OFFSET

[75] Inventor: Ramon S. Co, Milpitas, Calif.

[73] Assignee: 3 Com Corporation, Santa Clara, Calif.

[21] Appl. No.: 897,277

[22] Filed: Aug. 13, 1992

[51] Int. Cl.$^6$ .............................. H04B 1/10
[52] U.S. Cl. ...................... 375/351; 375/340; 375/317
[58] Field of Search ............ 375/104, 94, 106, 76; 455/218

[56] References Cited

U.S. PATENT DOCUMENTS

| | | | |
|---|---|---|---|
| 4,229,831 | 10/1980 | Lacher | 375/94 |
| 4,908,530 | 3/1990 | Huang | 375/104 |
| 5,222,078 | 6/1993 | Cason et al. | 375/76 |
| 5,327,465 | 7/1994 | Wincn et al. | 375/104 |

OTHER PUBLICATIONS

Sedra and Smith, Microelectronic Circuits, 1987, pp. 231 & 885.

Primary Examiner—Stephen Chin
Assistant Examiner—William Luther
Attorney, Agent, or Firm—Joseph A. Sawyer, Jr.; Judy M. Maher

[57] ABSTRACT

An improved circuit topology for implementing level detection and data restoration operations on an input sinusoid. The differential high-frequency level detector and data restoration circuits of the present invention each include a differential input having a pair of circuit nodes for receiving a differential input signal. A slicing offset network is disposed to generate first and second differential signals in response to the differential input signal. The present invention further includes first and second comparators for respectively providing latch set and latch reset signals in response to the first and second offset differential signals. The data restoration circuit of the present invention further includes a latch operative to synthesize a recovered data waveform in accordance with pairs of set and reset signals. Similarly, the inventive level detector includes a latch which utilizes set and reset signals to generate a level detection signal.

9 Claims, 7 Drawing Sheets

DIFFERENTIAL HIGH FREQUENCY LEVEL DETECTOR AND DATA RESTORATION CIRCUIT INCLUDING SQUELCH OFFSET AND SLICING OFFSET

BACKGROUND OF THE INVENTION

1. Field of the Invention

The present invention relates to the transmission of data within digital systems. More specifically, this invention relates to the restoration and detection of such transmitted data.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

The interest in local-area networks (LANs) is steadily increasing. Local area networks facilitate economical data communication between computing systems clustered in a locality. One such network used widely in the art is known as a token ring LAN.

A token ring LAN is a circular network having a plurality of stations (nodes) interconnected in a ring topology. The nodes of the system (e.g., computers, printers and other devices) are connected to a cable and assigned a unique address. Access to the network is controlled by the possession of a signal "token". The token is a packet of signals that is passed from node to node. The node that has the token has control of the network with respect to the transmission of data to other nodes and the receipt of data from same. When the node has completed a transmission, the token is released for acquisition by another node.

Errors in data transmission within the ring can generally be minimized by operating the ring in a synchronous mode. One method of synchronizing operation of the system nodes is to key all nodes to a particular master clock and extract the clock information from transmitted data with the aid of a phase-locked loop (PLL). In this regard the Manchester coding scheme is favored as allowing for relatively simple clock extraction.

In Manchester encoded data transmissions the first half of each data bit is the inverse of the last half. Accordingly, a zero crossing is present at every midbit interval irrespective of the specific data pattern. A Manchester encoded "preamble" is often transmitted together with a data pattern to enable the receiver to synchronize with and lock on to the transmitter clock signal. The receiver is thus able to distinguish individually received data bits, and to synchronize its internal processes to those of the transmitter without the aid of a separately transmitted clock signal.

As implied by the above, clock information may be recovered from a Manchester waveform simply by determining the time of each zero crossing. Hence, in certain LANs, sinusoids, derived from the bi-phase data patterns, are transmitted over the network data bus. The sinusoids are generated by passing the binary Manchester data through a low-pass filter prior to transmission on the data bus. Hence, higher-order harmonics are removed from the data waveform while the essential zero-crossing information is retained. This transmission scheme is advantageous in that transmission of the analog sinusoid may be effected without the dispersion generally accompanying digital transmissions over coaxial, twisted-pair, and other copper media.

The incidence of these sinusoidal data packets upon a receiver network is typically sensed by level detectors commonly known as "squelch" circuits. Squelch circuits are used to enable or disable a receiver circuit. Squelch circuits detect signal energy in excess of a predetermined voltage threshold. The detection threshold is generally selected to be less than the anticipated energy level of the sinusoidal transmissions. In addition, a squelch reset threshold is chosen to be commensurate with the expected DC component (DC offset) of the incident sinusoidal waveform. Unfortunately, variation in the DC component of the sinusoidal data packet (i.e. common mode noise) may cause conventional squelch circuits to produce errant detection signals.

Squelch circuits typically operate in conjunction with "slicer" data restoration circuits disposed to extract zero-crossing information from the transmitted sinusoid. Rather than endeavoring to directly ascertain the location of each zero-crossing, slicer circuits are designed to detect signal energy at threshold levels during zero-crossings of either polarity. If the thresholds are chosen to be relatively close to zero, then the phase distortion introduced into the reconstructed data waveform will be minimal. However, selecting detection thresholds relatively close to zero increases the probability that noise energy carried by the incident sinusoid will cause the slicer circuit to register false zero crossings. Hence, in conventional slicer data restoration circuits the detection thresholds are chosen by balancing the competing demands of noise immunity and reduced phase distortion. Again, common mode variation in the average signal energy introduces a phase error into the recovered waveform and exacerbates the aforementioned difficulties associated with common mode noise.

Both slice and squelch circuits have been conventionally realized using Schmidt triggers. In a Schmidt trigger, a closed loop network is formed by linking the output and non-inverting inputs of a comparator with a resistive feedback path. Unfortunately, the single non-differential input arrangement of a Schmidt trigger results in susceptibility to the adverse effects of common mode signal variation described above. Moreover, the comparators included within Schmidt triggers are often ill-suited to drive the resistive feedback loop at high frequency.

Accordingly, a need in the art exists for level detection and data restoration arrangements having decreased sensitivity to common mode signal variation and improved high-frequency response.

SUMMARY OF THE INVENTION

The aforementioned need in the art for improved circuit arrangements for implementing level detection and data restoration operations upon an input sinusoid are addressed by the differential high-frequency level detector and data restoration circuits of the present invention. The inventive differential circuits of the present invention each include a differential input having a pair of circuit nodes for receiving a differential input signal. A squelch offset network is disposed to generate first and second differential signals in response to the differential input signal. The present invention further includes first and second comparators for respectively providing latch set and latch reset signals in response to the first and second offset differential signals. The data restoration circuit of the present invention further includes a latch operative to synthesize a recovered data waveform in accordance with pairs of set and reset signals. Similarly, the inventive level detector includes a latch which utilizes set and reset signals to generate a level detection signal.

DETAILED DESCRIPTION OF THE INVENTION

Figure 1:
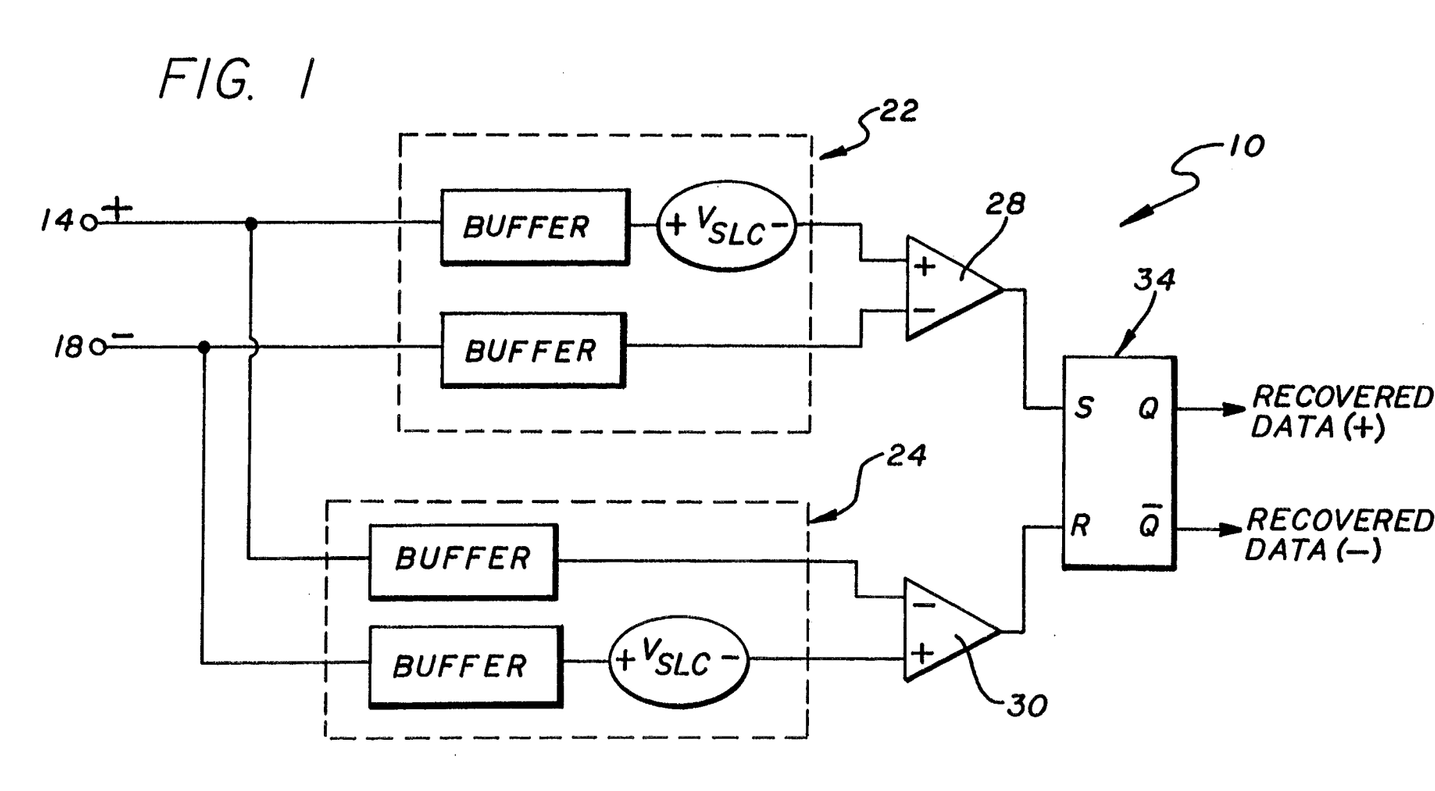
FIG. 1 shows a block diagram of a preferred embodiment of the high-efficiency data restoration circuit of the present invention.

FIG. 1 shows a block diagram of a preferred embodiment of the high-efficiency data restoration circuit 10 of the present invention. In the embodiment of FIG. 1 the inventive restoration circuit 10 is addressed by a differential input signal impressed on positive and negative input circuit nodes 14 and 18. The input nodes 14 and 18 may be in communication with a coaxial cable or other transmission media. In particular instances, the input signal will consist of the fundamental sinusoidal waveform associated with a stream of Manchester data. As noted in the Background of the Invention, such surrogate sinusoidal signals may be generated by passing a bi-phase data waveform through a low-pass filter. Again, these signal approximations carry the zero-crossing information inherent in the original Manchester data but are generally less susceptible to the dispersive effects of cable transmission.

As described below, the inventive data restoration circuit 10 is operative to synthesize a bi-phase output signal incorporating the zero-crossing information inherent within the input sinusoidal waveform. More specifically, the positive and negative input circuit nodes 14 and 18 are coupled to first and second slicing offset networks 22 and 24. The first and second slicing offset networks 22 and 24 are disposed to provide first and second differential slicing signals to first and second latch driver comparators 28 and 30. The first and second slicing signals essentially replicate the differential input signal at differing DC offset voltages. As is indicated by FIG. 1, the first and second comparators 28 and 30 drive the set and reset terminals of a first SR latch 34 in accordance with the first and second differential slicing signals. In response, the bi-phase output waveform and inverse thereof are provided at the Q and complementary Q output terminals of the first SR latch 34.

Figure 2:
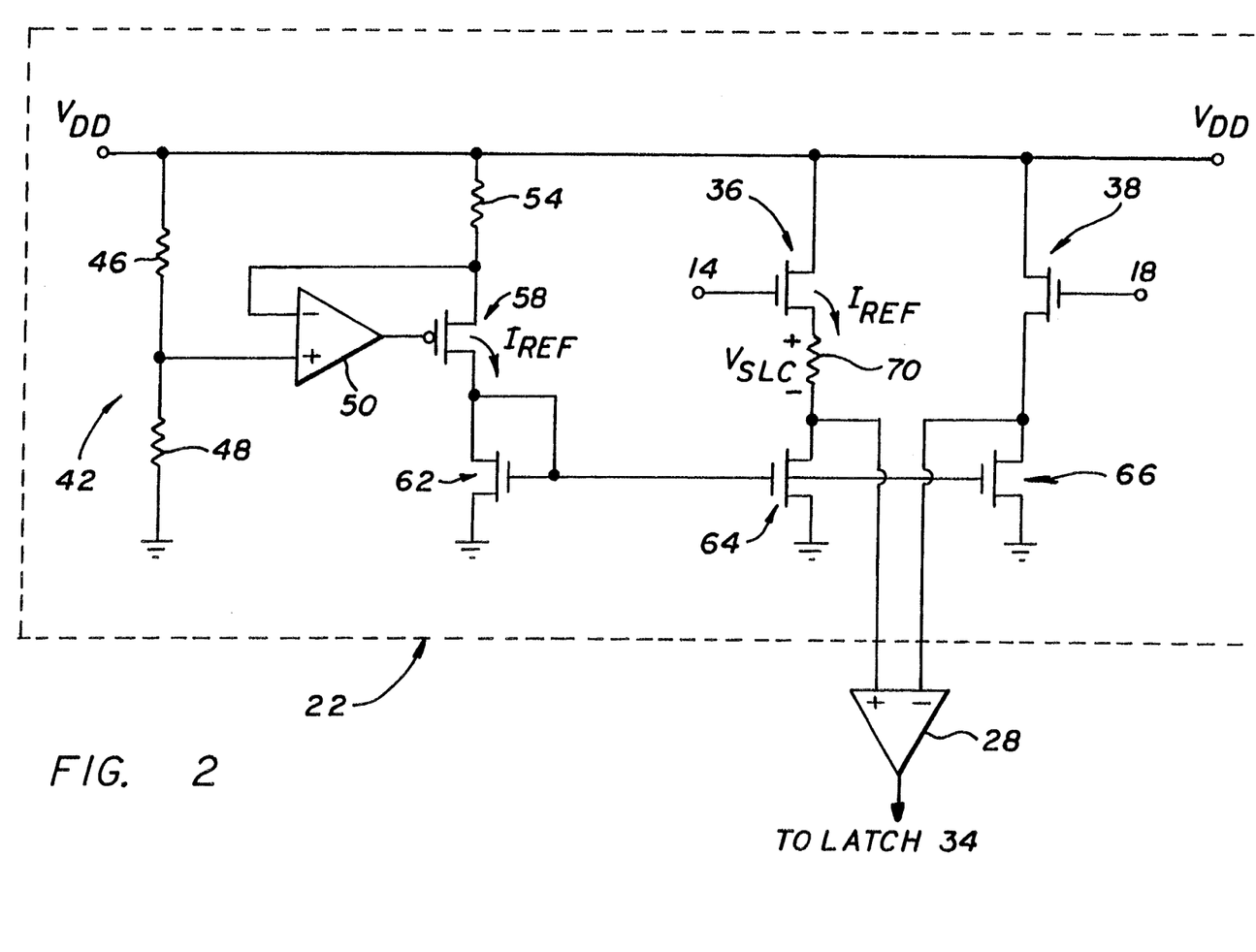
FIG. 2 is a schematic diagram of a first slicing offset network included within a preferred embodiment of the inventive data restoration circuit.

FIG. 2 is a schematic diagram of the first slicing offset network 22. The first slicing network 22 includes first and second buffer transistors 36 and 38 for receiving the differential input signal impressed on the positive and negative input nodes 14 and 18. In the implementation of FIG. 2, the first and second transistors 36 and 38 are realized as n-channel MOSFET's and are powered by a voltage source $V_{DD}$.

Referring to FIG. 2, the first offset network 22 includes a first voltage reference circuit 42 designed to induce a current $I_{ref}$ to flow through the first and second buffer transistors 36 and 38. In particular, the reference circuit 42 includes first and second reference resistors 46 and 48 for dividing the supply voltage $V_{DD}$. The reference resistors 46 and 48 will generally be selected to be of an equivalent magnitude $R_{ref}$. In this manner, one-half of the voltage $V_{DD}$ is provided to the non-inverting input terminal of a first reference amplifier 50. By selecting a third reference resistor 54 also to be of magnitude $R_{ref}$, the magnitude of the reference current $I_{ref}$ is seen to be equivalent to 0.5 $(V_{DD}/R_{ref})$. The reference current $I_{ref}$ flows from the third reference resistor 54 through a first p-channel MOSFET 58 driven by the reference amplifier 50. A current mirror formed by first, second and third n-channel MOSFET's 62, 64 and 66 then induces $I_{ref}$ to be conducted by the first and second buffer transistors 36 and 38.

As shown in FIG. 2, the voltage impressed on the positive input node 14 is offset by a first slicing voltage $V_{slc}$ prior to being supplied to the non-inverting terminal of the first latch comparator 28. The slicing offset voltage is generated by conduction of the reference current $I_{ref}$ through a first slicing resistor 70. Accordingly, the magnitude of the first slicing offset voltage may be adjusted by varying the ratio between the first slicing resistor 70 and the third reference resistor 54. Since resistor ratios may be precisely controlled using conventional integrated circuit (IC) fabrication techniques, the slicing offset voltage may be adjusted with a high degree of accuracy when the restoration circuit 10 is realized as an IC.

The second slicing offset network 24 will preferably be realized so as to be substantially identical to the first offset network 22. Although the circuit topologies of the first and second offset networks 22 and 24 will generally be the same, in the second offset network 24 the gate of transistor 36 is connected to the negative input 18, and the gate of transistor 38 is connected to the positive input 14. The voltage impressed on the negative input circuit node 18 (relative to the positive node 14) is raised by the voltage drop across a second slicing resistance. The second slicing resistance will generally be chosen to be identical to the first slicing resistance. In this manner the DC offset of the second differential slicing signal relative to the DC component of the input sinusoid is made equal and opposite the offset of the first differential signal. Again, the second differential signal is applied to the second latch comparator 30.

Figure 3:
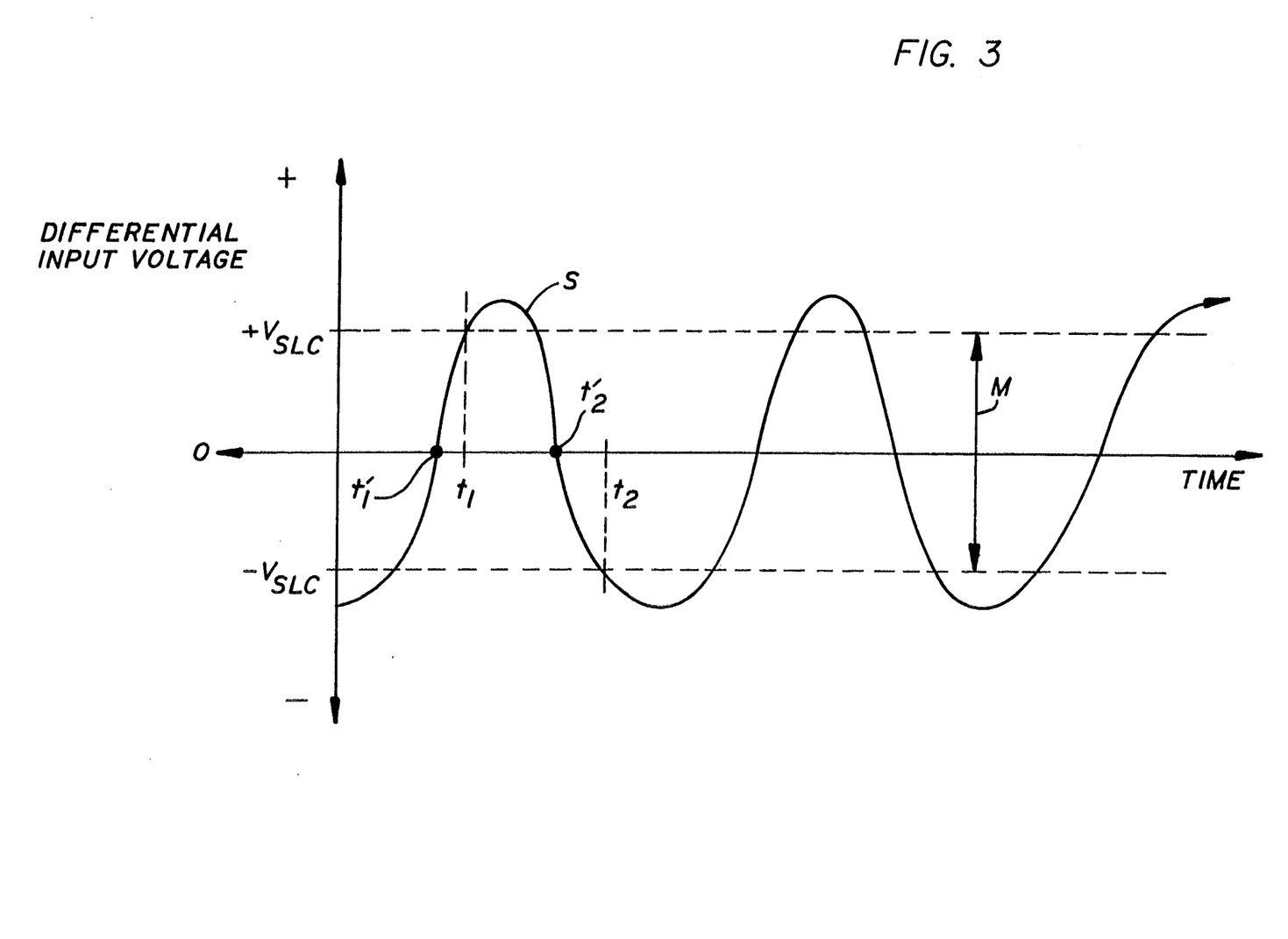
FIG. 3 illustrates the manner in which the inventive data restoration circuit operates to sample a sinusoidal differential input signal S.

FIG. 3 illustrates the manner in which the inventive data restoration circuit 10 operates to sample a sinusoidal differential input signal S. As is indicated by FIG. 3, at time $t_1$ the voltage at the positive input node 14 exceeds that at the negative input node 18 by $V_{slc}$. At this point the first slicing differential signal supplied to the first latch comparator 28 by the first slicing offset network 22 turns slightly positive. Thus, the latch 34 is set and a logical high is provided at the Q output terminal thereof. At time $t_2$, the voltage present on the negative input terminal 18 exceeds that urged on the positive terminal 14 by the slicing offset voltage $V_{slc}$. Again, at this juncture the second differential slicing signal delivered to the latch comparator 30 by the second slicing offset network 24 becomes positive with respect to the inverting input terminal thereof. It follows that the latch 34 is reset, thus resulting in a logical low being produced at the Q output terminal of the latch 34. In this manner, the latch 34 produces the bi-phase waveform recovered from the differential sinusoidal input signal.

Referring again to FIG. 3, a first noise margin M of the inventive circuit 10 is equivalent to the voltage difference between the $+V_{slc}$ and $-V_{slc}$ detection thresholds (i.e. 2 $V_{slc}$). The first noise margin M should be selected to be sufficiently large such that parasitic noise carried by the input sinusoid will not erroneously trigger the latch 34 to change state. Nonetheless, reducing the noise margin M results in the transitions in the output waveform at $t_1$ and $t_2$ more closely mirroring the actual zero-crossings of the input sinusoid S at $t_1'$ and $t_2'$. As the quantities $(t_1-t_1')$ and $(t_2-t_2')$ are proportional to the phase difference between the input sinusoid and the bi-phase recovered data signal, the noise margin M will preferably be selected in accordance with desired noise immunity and phase tracking.

Figure 4:
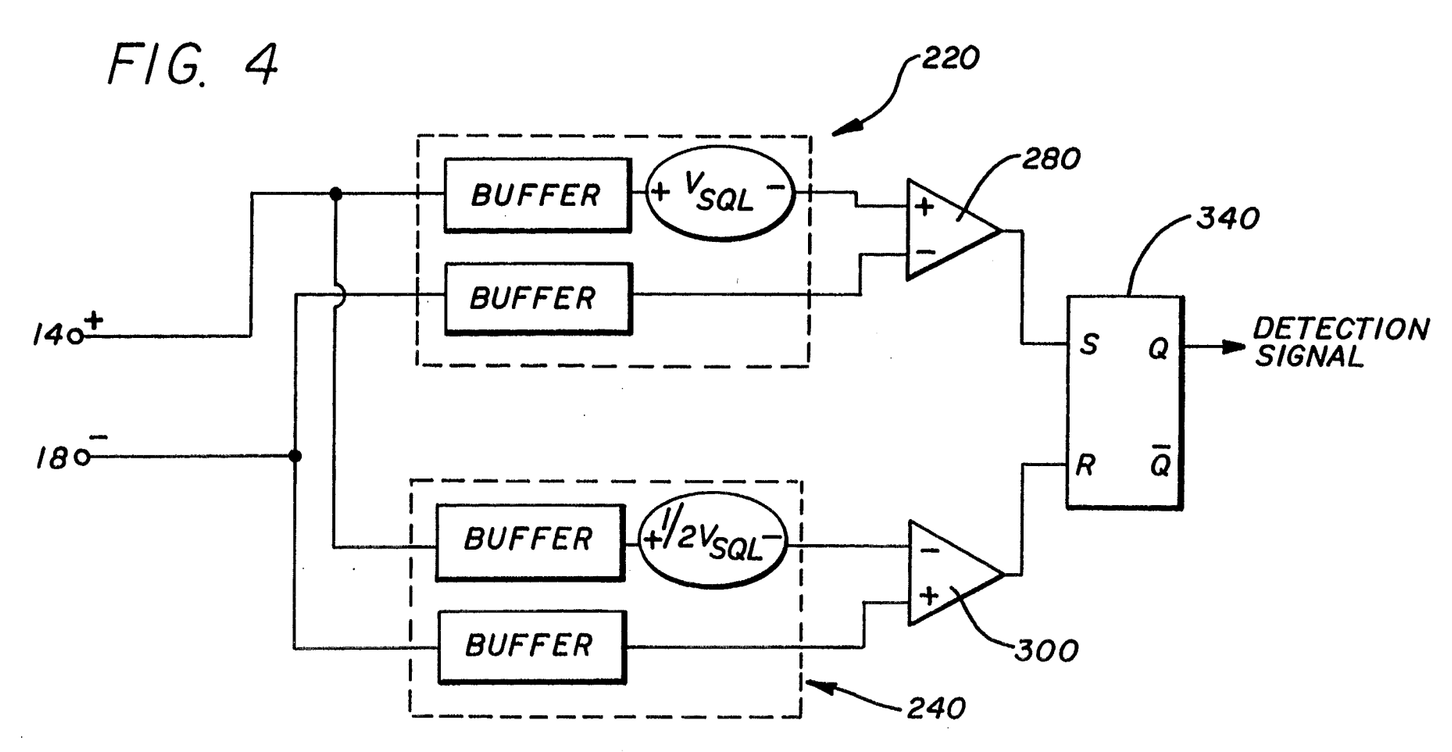
FIG. 4 shows a block diagram of a preferred embodiment of the high-efficiency level detector circuit of the present invention.

FIG. 4 shows a block diagram of a preferred embodiment of the high-efficiency level detector circuit 100 of the present invention. Again, the inventive detector circuit 100 is addressed by a differential input signal impressed on positive and negative input circuit nodes 14 and 18.

As is described below, the inventive level detector circuit 100 is operative to detect signal energy impressed on the input circuit nodes 14 and 18 in excess of a predefined detection threshold. Referring to FIG. 4, the positive circuit node 14 is coupled to a first squelch offset network 220 similar to slicing network 22, while the negative node 18 is connected to a second squelch offset network 240. The first and second squelch offset networks 220 and 240 are disposed to provide first and second differential squelch signals to first and fourth latch driver comparators 280 and 300. The first and second squelch signals are substantially differentially identical to the sinusoidal input signal, but have DC offsets different therefrom. As is indicated by FIG. 4, the third and fourth comparators 280 and 300 drive the set and reset terminals of a second SR latch 340 in accordance with the first and second differential squelch signals. A bi-phase detection signal, indicative of incident differential signal energy in excess of a detection threshold, is provided by the Q output terminal of the second SR latch 340.

Figure 5:
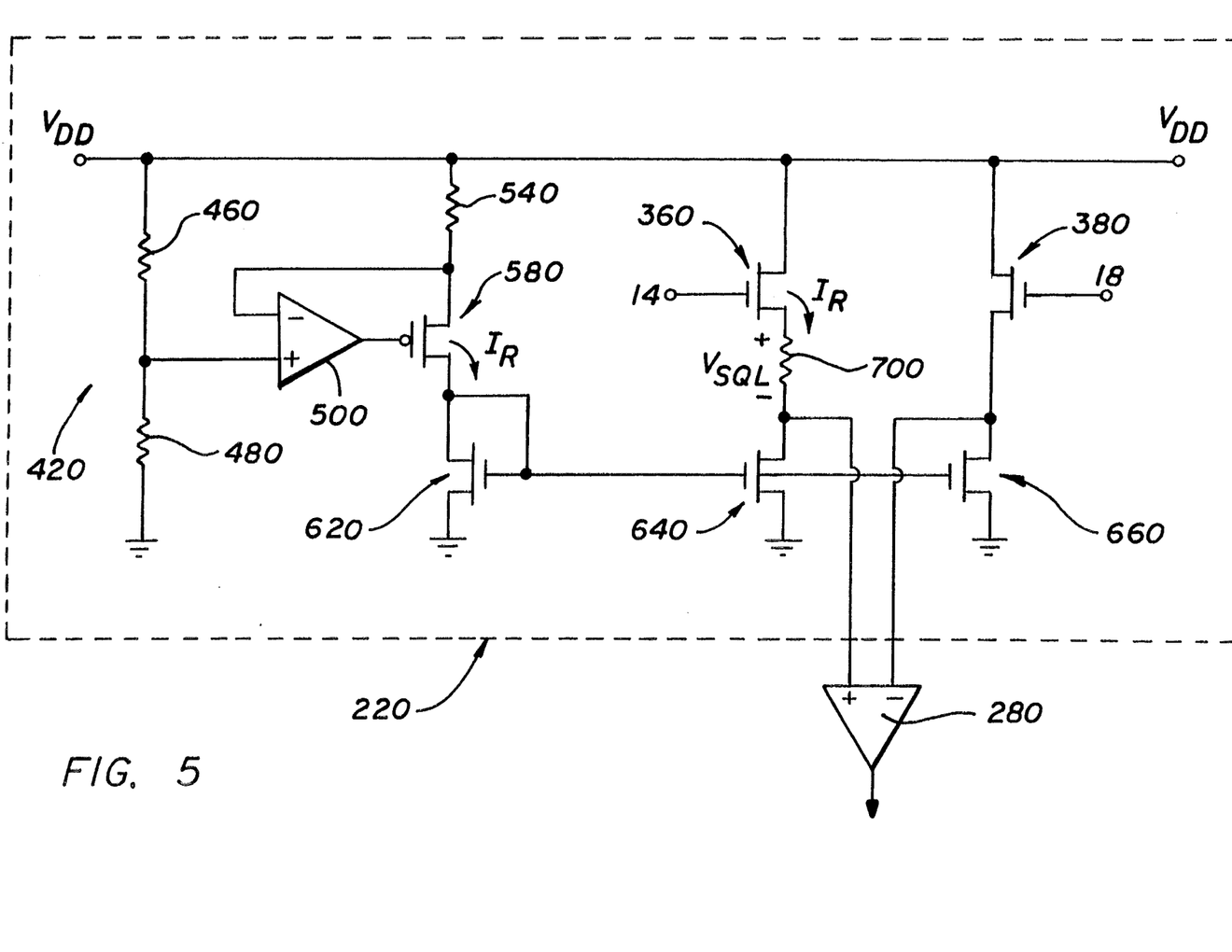
FIG. 5 is a schematic diagram of a first squelch offset network included within the inventive level detector.

FIG. 5 is a schematic diagram of the first squelch offset network 220. The first squelch network 220 includes third and fourth buffer transistors 360 and 380 for receiving the differential input signal impressed on the positive and negative input nodes 14 and 18. In the implementation of FIG. 5, the third and fourth buffer transistors 360 and 380 are realized as n-channel MOSFET's and are powered by the voltage source $V_{DD}$.

Referring to FIG. 5, the first offset network 220 includes a second voltage reference circuit 420 designed to induce a current $I_r$ to flow through the third and fourth buffer transistors 360 and 380. In particular, the second reference circuit 420 includes primary and secondary reference resistors 460 and 480 for dividing the supply voltage $V_{DD}$. The primary and secondary reference resistors 460 and 480 will generally be selected to have an equivalent magnitude denoted by $R_r$. Thus, one-half of the voltage $V_{DD}$ will typically be provided to the non-inverting input terminal of a second reference amplifier 500. By selecting a tertiary reference resistor 540 also to be of magnitude $R_r$, the magnitude of the reference current $I_r$ is seen to be equivalent to 0.5 $(V_{DD}/R_r)$. The reference current $I_r$ flows from the tertiary reference resistor 540 through a second p-channel MOSFET 580 driven by the second reference amplifier 500. A current mirror formed by primary, secondary and tertiary n-channel MOSFET's 620, 640 and 660 then induces $I_r$ to be conducted by the third and fourth buffer transistors 360 and 380.

As shown in FIG. 5, the voltage impressed on the positive input node 14 is offset by a second squelch voltage $V_{sql}$ prior to being supplied to the non-inverting terminal of the third latch comparator 280. The second squelch offset voltage is generated by conduction of the second reference current $I_r$ through a second squelch resistor 700. In this manner, the magnitude of the second squelch offset voltage may be adjusted by varying the ratio between the second squelch resistor 700 and the tertiary reference resistor 540. Thus, the magnitude of the second squelch offset voltage is seen to be independent of the absolute value of the reference resistance $R_r$, and dependent only upon the resistor ratio given above. Since resistor ratios may be precisely controlled using conventional integrated circuit (IC) fabrication techniques, the second squelch offset voltage may be adjusted with a high degree of accuracy when the inventive detector 100 is realized as an IC.

The second squelch offset network 240 will be topologically identical to the first offset network 220. However, in the second squelch offset network the second squelch resistor 700 will be replaced by a third squelch resistor of approximately one-half the magnitude thereof. The third squelch resistor is placed at the source of the transistor 380, with the gate of transistor 380 being connected to input 14. In like manner the gate of transistor 360 is connected to input 18. The reference current $I_r$ thus induces to develop across the third squelch resistor a third squelch offset voltage having a magnitude of one-half of the second squelch offset voltage. The latch 340 will be reset if the differential input signal is drops below the third squelch offset voltage.

Figure 6:
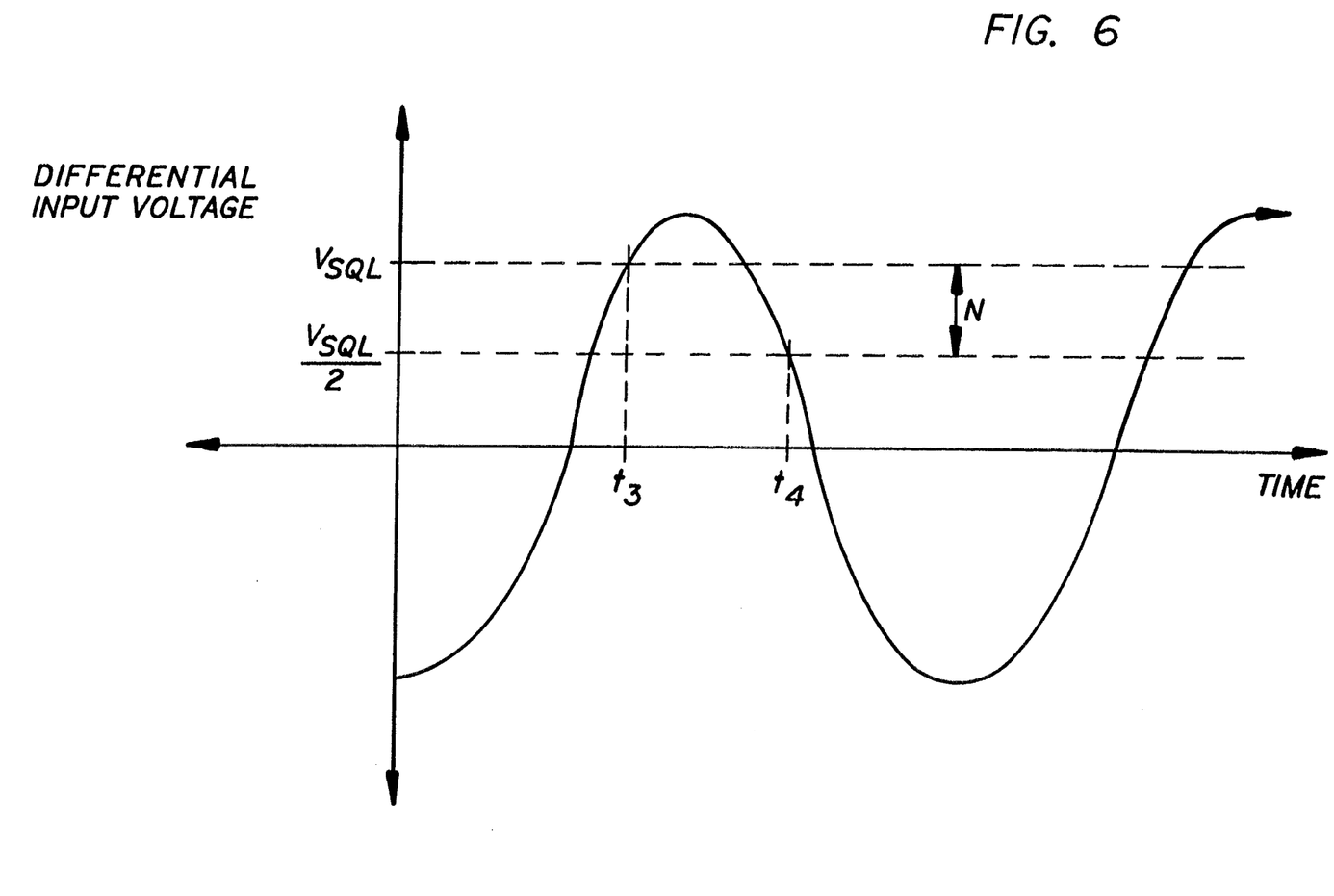
FIG. 6 illustrates the manner in which the inventive level detector circuit operates to detect differential signal energy having a maximum magnitude larger than a second slicing offset voltage $V_S$.

FIG. 6 illustrates the manner in which the inventive level detector circuit 100 operates to detect differential signal energy having a maximum magnitude larger than the second squelch offset voltage $V_{sql}$. As is indicated in FIG. 6, at time $t_3$ the voltage at the positive input node 14 exceeds that at the negative input node 18 by $V_{sql}$. At this point the third squelch differential signal supplied to the third latch comparator 280 by the first squelch offset network 220 turns slightly positive. Thus, the latch 340 is set and a logical high is provided at the Q output terminal thereof. At time $t_4$ the voltage present on the positive input node 14 is less than $V_{sql}/2$ relative to the voltage impressed upon the negative input node 18. It follows that at time $t_4$, the second differential squelch signal synthesized by the second squelch offset network 240 becomes positive with respect to the non-inverting input terminal of the fourth differential comparator 300. The latch 340 is thus reset, which results in a logical low being produced at the Q output terminal of the latch 340. Hence, a transition from a logical low to a logical high at the Q output of the latch 340 corresponds to the application of a differential voltage larger than $V_{sql}$ across the input terminals 14 and 18. Similarly, a transition from high to low corresponds to a differential input smaller than $V_{sql}/2$ across terminals 14 and 18.

Referring again to FIG. 6, the reset threshold of $V_{sql}/2$ is chosen to be equivalent to the anticipated DC offset of the input sinusoidal signal energy. This gives rise to a second noise margin N of $V_{sql}/2$ between the set threshold voltage $V_{sql}$ and the reset threshold $V_{sql}/2$. Such a selection of the reset voltage is designed to minimize the probability that noise carried by the input differential signal will cause the latch 340 to be falsely reset. In addition, the set threshold $V_{sql}$ will generally be chosen to be larger than the corresponding slicing threshold $V_{slc}$ of the inventive data restoration circuit 10. This result follows by again observing that the phase error introduced by the circuit 10 is minimized as the slicing voltage $V_{slc}$ is reduced to a level governed by the magnitude of the input noise energy.

The inventive data restoration circuit and level detector may be realized in alternative embodiments exhibiting decreased sensitivity to common mode variation in the input signal. In particular, each chain-connected slicing offset network and associated comparator may be merged into a dual-mode comparator arrangement having improved common mode response. The advantages of such an arrangement may be appreciated by reference to the discussion below relating to FIG. 7.

Figure 7:
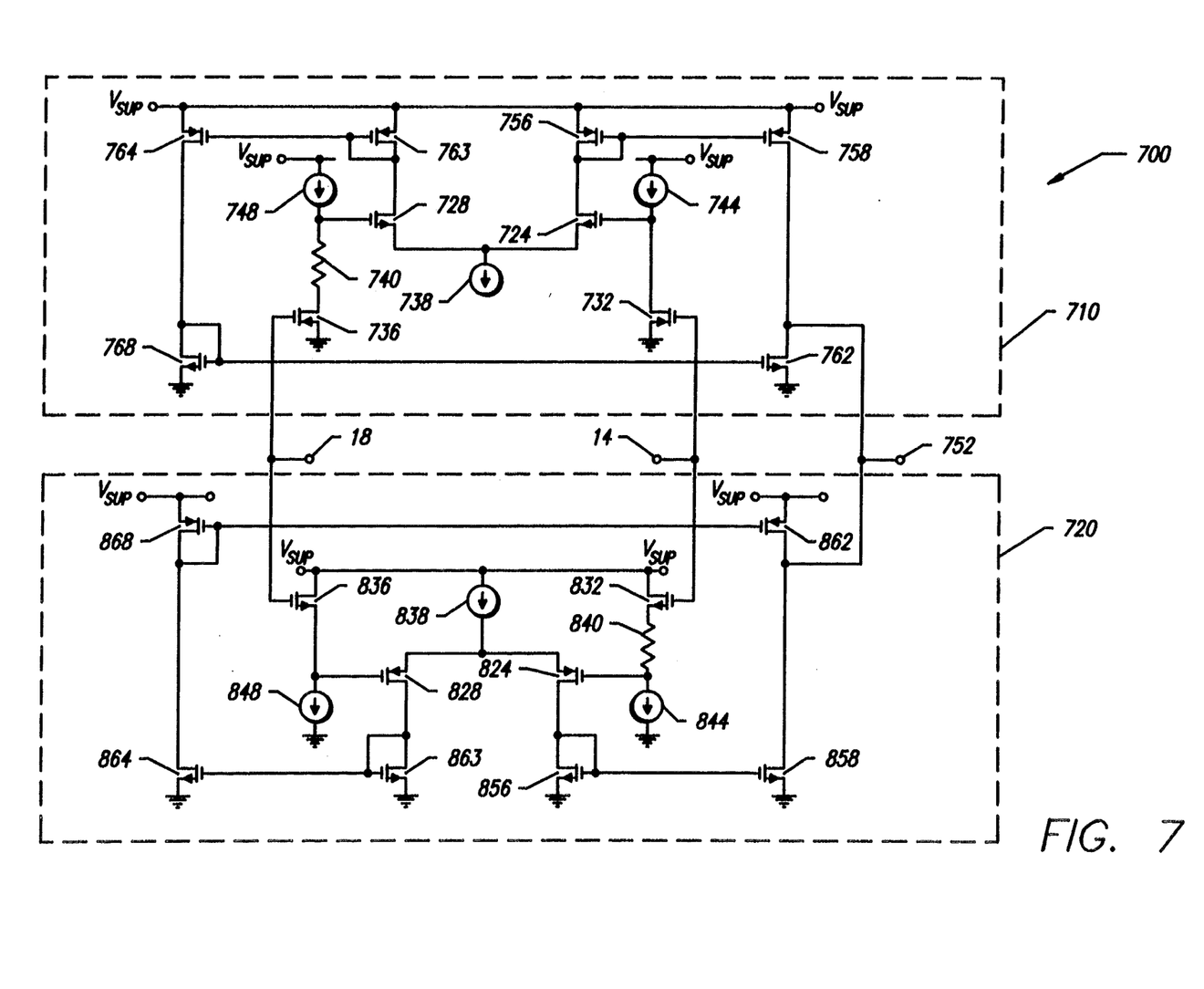
FIG. 7 is a schematic diagram of a dual-mode comparator arrangement disposed to drive SR latches included within the inventive level detector and data restoration circuits.

FIG. 7 is a schematic diagram of a dual-mode comparator arrangement 700 disposed to drive the SR latches included within the preferred embodiments of the inventive level detector and data restoration circuits described herein. For example, in the embodiment of FIG. 1, a first dual-mode comparator arrangement could be substituted for the first offset network 22 and first latch comparator 28, while a second dual-mode comparator arrangement could be utilized in lieu of the second offset network 24 and second comparator 30. The first comparator would be interposed between inputs 14 and 18 and the S input of an SR latch, while the second comparator would be positioned between inputs 14 and 18 and the R input of the SR latch.

Referring to FIG. 7, the comparator arrangement 700 includes a primary squelch offset network 710 and a secondary squelch offset network 720 connected in parallel to the positive and negative input nodes 14 and 18. The primary offset network 710 includes first and second n-channel MOSFET transistor gates 724 and 728 designed to serve as a differential pair. The gates 724 and 728 are operatively coupled to the positive and negative input nodes 14 and 18 via primary and secondary p-channel MOSFET buffer transistors 732 and 736, respectively. The source terminals of each of the gates 724 and 728 are connected to a first input stage current source 738. In addition, a primary squelch resistor 740 is connected between the secondary p-channel buffer transistor 736 and the second transistor gate 728. As is indicated by FIG. 7, first and second buffer current sources 744 and 748 operatively coupled to a supply voltage $V_{sup}$ bias the p-channel transistors 732 and 736. The magnitude of the current sources 744 and 748 is chosen such that the differential pair formed by the gates 724 and 728 floats at a DC level larger than one-half of the supply voltage $V_{sup}$. In addition, the current from the second buffer source 748 also serves to induce the squelch offset voltage (see, e.g. FIG. 3 and FIG. 6) to develop across the primary squelch resistor 740.

As described below with reference to the second comparator module 720, a p-channel differential pair included therein will be biased at a DC level less than one-half of the supply voltage $V_{sup}$. In this manner, the first comparator module 710 will be more responsive to differential input signals having common mode voltages between $V_{sup}/2$ and ground, while the second comparator module 720 will be more responsive to differential inputs having common mode voltages from $V_{sup}/2$ to $V_{sup}$. The differential pairs within the modules 710 and 720 will preferably be biased so as to contribute equally to the voltage impressed on a latch interface node 752 in response to differential inputs having common mode offsets of $V_{sup}/2$. Hence, by employing parallel-connected n-channel and p-channel differential pairs the dual-mode comparator arrangement 700 is designed to be equally responsive to differential inputs having common mode voltages between $V_{sup}$ and ground. In contrast, conventional comparators tend to exhibit less gain when driven by differential inputs centered near one extreme of the common mode range.

Referring again to FIG. 7, the first comparator module 710 includes first and second transistor current mirrors operatively coupled to the differential pair transistors 724 and 728. The first current mirror is composed of first and second p-channel current mirror transistors 756 and 758 in communication with the supply voltage $V_{sup}$. The second p-channel transistor 758 is connected to the interface node 752 and supplies current to a first output buffer transistor 762. Similarly, the second current mirror includes third and fourth p-channel current mirror transistors 763 and 764 also energized by the supply voltage $V_{sup}$. In addition, the fourth p-channel current mirror transistor 764 supplies current to a second output buffer transistor 768.

The secondary offset network 720 includes first and second p-channel MOSFET transistor gates 824 and 828 designed to serve as a differential pair. The gates 824 and 828 are operatively coupled to the positive and negative input nodes 14 and 18 via primary and secondary n-channel MOSFET buffer transistors 832 and 836, respectively. A bias current is supplied to the first and second p-channel gates 824 and 828 by a second input stage current source 838. In addition, a secondary squelch resistor 840 is connected between the primary n-channel buffer transistor 832 and the first p-channel transistor gate 824. As is indicated by FIG. 7, third and fourth buffer current sources 844 and 848 induce a bias current to flow within the n-channel transistors 832 and 836. Again, the magnitude of the current sources 844 and 848 is chosen such that the differential pair formed by the gates 824 and 828 nominally operates at a DC level less than $V_{sup}/2$.

Referring again to FIG. 7, the second comparator module 720 includes primary and secondary transistor current mirrors operatively coupled to the differential pair transistors 824 and 828. The primary current mirror is composed of first and second n-channel current mirror transistors 856 and 858, with the first n-channel transistor 856 being in communication with the differential pair transistor 824. The second n-channel transistor 858 is connected to the interface node 752 and supplies current to a primary output buffer transistor 862. Similarly, the secondary current mirror includes third and fourth n-channel current mirror transistors 863 and 864. The fourth n-channel current mirror transistor 864 supplies current to a secondary output buffer transistor 868 arranged in a common gate configuration with the primary buffer transistor 862.

While the present invention has been described herein with reference to a particular embodiment, it is understood that the invention is not limited thereto. The teachings of this invention may be utilized by one having ordinary skill in the art to make modifications within the scope thereof. For example, in alternative embodiments of the present invention a bandgap reference may be substituted for the resistive voltage divider included within the voltage reference circuits of the squelch offset networks. In addition, the transistor networks described herein are not limited to circuit realizations employing MOSFET's. Other transistor technologies may be more suitable for particular specialized applications.

It is therefore contemplated by the appended claims to cover any and all such modifications.

Accordingly,

What is claimed is:

1. A high-frequency data restoration circuit comprising:
    offset means for generating first and second offset differential signals in response to a differential input signal said offset means includes a first slicing offset circuit for altering the voltage difference between said positive input terminal and said first non-inverting terminal, said first slicing offset circuit further including first and second buffer transistors, said first buffer transistor having a first control terminal coupled to said positive input circuit and said second buffer transistor having a second control terminal coupled to said negative input circuit node, said offset means includes a second slicing offset circuit for altering the voltage difference between said negative input terminal and said second non-inverting terminal;
    first comparator means for providing a latch set signal in response to said first offset differential signal, said first comparator means having first inverting and non-inverting terminals;
    second comparator means for providing a latch reset signal in response to said second offset differential signal, said second offset differential signal, said second comparator means having second inverting and non-inverting terminals; and
    latch means for synthesizing a recovered data waveform in accordance with said set and reset signals.

2. The data restoration circuit of claim 1 wherein said first slicing offset circuit includes a first reference voltage circuit for maintaining a constant slicing current through said first and second buffer transistors.

3. The data restoration circuit of claim 2 wherein said first slicing offset circuit includes a first slicing resistor coupled between said first buffer transistor and said first non-inverting input terminal.

4. The data restoration circuit of claim 3 wherein said second slicing offset circuit includes:
    third and fourth buffer transistors, said third buffer transistor having a third control terminal coupled to said negative input circuit node and said fourth buffer transistor having a fourth control terminal coupled to said positive input circuit node,
    a second reference voltage circuit for maintaining a constant slicing current through said third and fourth buffer transistors, and
    a second slicing resistor coupled between said third buffer transistor and said second non-inverting input terminal.

5. The data restoration circuit of claim 1 wherein said latch means includes an SR latch having:
    an S input terminal driven by said latch set signal and an R input terminal driven by said latch reset signal,
    a Q output port for providing said recovered data waveform, and
    a complementary Q output port for providing a complementary recovered data waveform.

6. A differential high-frequency data restoration circuit having decreased sensitivity to common mode signal variation, said circuit comprising:
    a positive and a negative input circuit node;
    first comparator means for generating a latch set signal in response to a differential input signal having an average value within a first common mode signal range, said first comparator means including first and second slicing offset networks operatively coupled to said positive and negative input circuit nodes said first slicing offset network is operative about a first DC bias voltage within said first common mode range, and wherein said second slicing offset network is operative about a second DC bias voltage within said first common mode range said first slicing offset network includes a first differential transistor pair operatively coupled to said positive input node via a first slicing resistor and wherein said second slicing offset network includes a second differential transistor pair operatively coupled to said negative input circuit node via a second slicing resistor;
    second comparator means for generating a latch reset signal in response to said differential input signal, said second comparator means including third and fourth slicing offset networks operatively coupled to said positive and negative input circuit nodes said third slicing offset network is operative about said first DEC bias voltage and wherein said fourth slicing offset network is operative about said second DC bias voltage; and
    latch means for synthesizing a recovered data waveform in accordance with said set and reset signals.

7. A high-frequency level detector comprising:
    a first comparator having first inverting and non-inverting terminals and a first output terminal;
    a second comparator having second inverting and non-inverting terminals and a second output terminal;
    a first squelch offset circuit for altering the voltage difference between a positive input terminal and a said first non-inverting terminal, said first squelch offset circuit further includes first and second buffer transistors, said first buffer transistor having a first control terminal coupled to said positive input circuit node and said second buffer transistor having a second control terminal coupled to said negative input circuit node and a first reference voltage circuit for maintaining a constant squelch current through said first and second buffer transistors;
    a second squelch offset circuit for altering the voltage difference between a negative input terminal and said second inverting terminal; and
    a latch circuit operatively coupled to said first and second output terminals, said latch circuit including a Q output port for providing a level detection signal.

8. The level detector of claim 7 wherein said second squelch offset circuit includes:
   third and fourth buffer transistors, said third buffer transistor having a third control terminal coupled to said negative input circuit node and said fourth buffer transistor having a fourth control terminal coupled to said positive input circuit node and
   a second reference voltage circuit for maintaining a constant squelch current through said third and fourth buffer transistors.

9. A differential level detector circuit having decreased sensitivity to common mode signal variation, said level detector comprising:
   a positive and a negative input circuit node;
   first comparator means for generating a latch set signal in response to an input signal having a maximum value in excess of a squelch threshold and an average value within a first common mode signal range, said first comparator means including first and second squelch offset networks operatively coupled to said positive and negative input circuit nodes said first squelch offset network is operative about a first DC bias voltage within said first common mode range, said first squelch offset circuit further includes first and second buffer transistors, said first buffer transistor having a first control terminal coupled to said positive input circuit node and said second buffer transistor having a second control terminal coupled to said negative input circuit node and a first reference voltage circuit for maintaining a constant squelch current through said first and second buffer transistors, and wherein said second squelch offset network is operative about a second DC bias voltage within said first common mode range;
   second comparator means for generating a latch reset signal upon the value of said input signal becoming less than a squelch reset threshold, said second comparator means including third and fourth squelch offset networks operatively coupled to said positive and negative input circuit nodes said third squelch offset network is operative about said first DC bias voltage and wherein said fourth squelch offset network is operative about said second DC bias voltage; and
   latch means for synthesizing a recovered data waveform in accordance with said set and reset signals.

* * * * *